Dec. 20, 1955   E. A. C. EICKSTAEDT   2,727,600
INTERRELATED SPEED AND CLUTCH CONTROLS FOR POWER PLANTS
Filed Nov. 23, 1954                               2 Sheets-Sheet 1
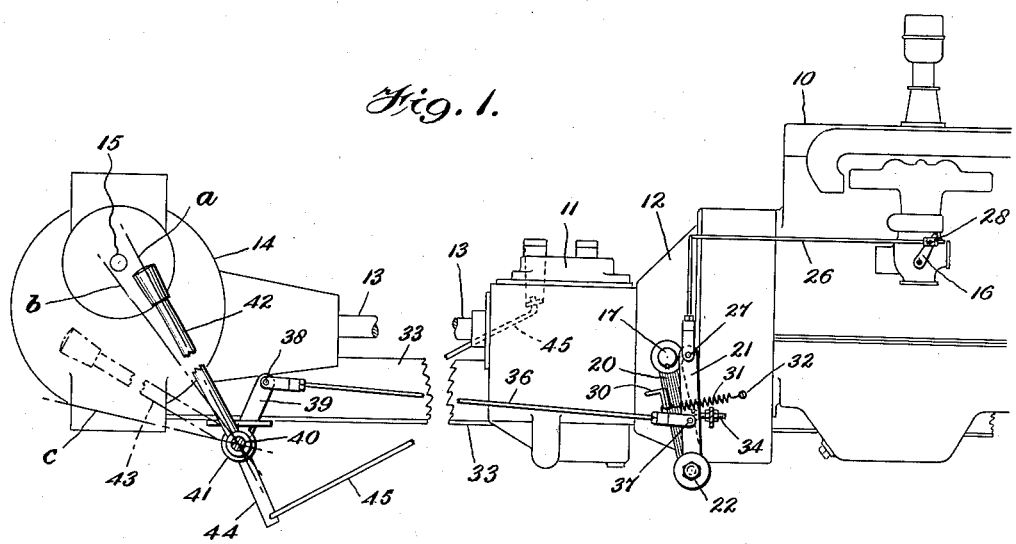
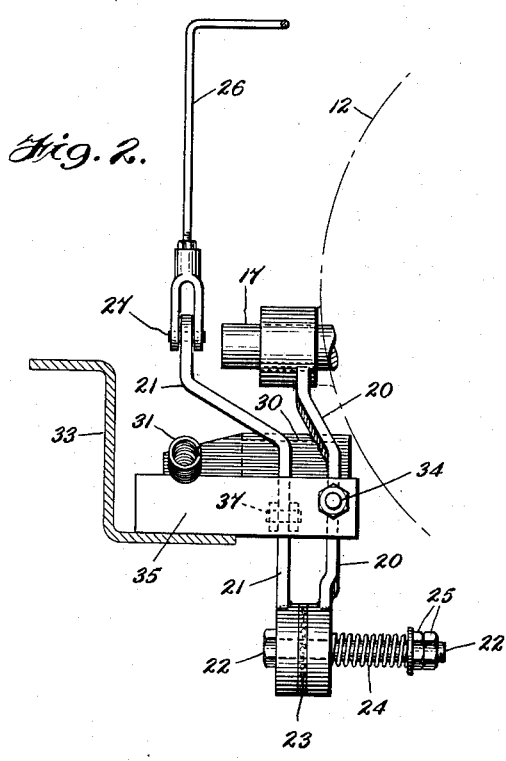
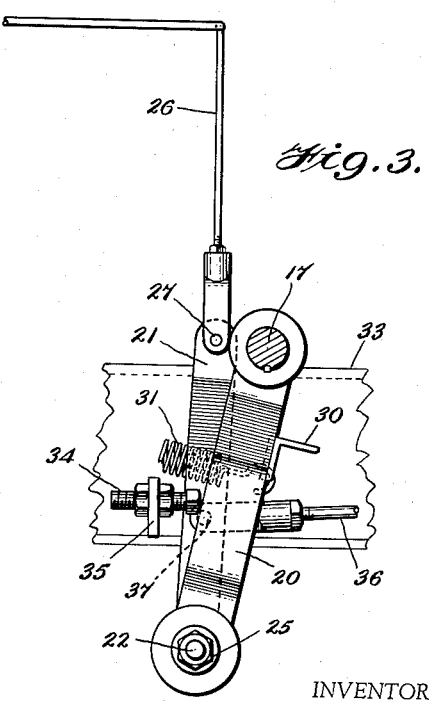
INVENTOR
*Edwin A. C. Eickstaedt,*
BY
ATTORNEY Dec. 20, 1955　　　E. A. C. EICKSTAEDT　　　2,727,600
INTERRELATED SPEED AND CLUTCH CONTROLS FOR POWER PLANTS
Filed Nov. 23, 1954　　　2 Sheets-Sheet 2
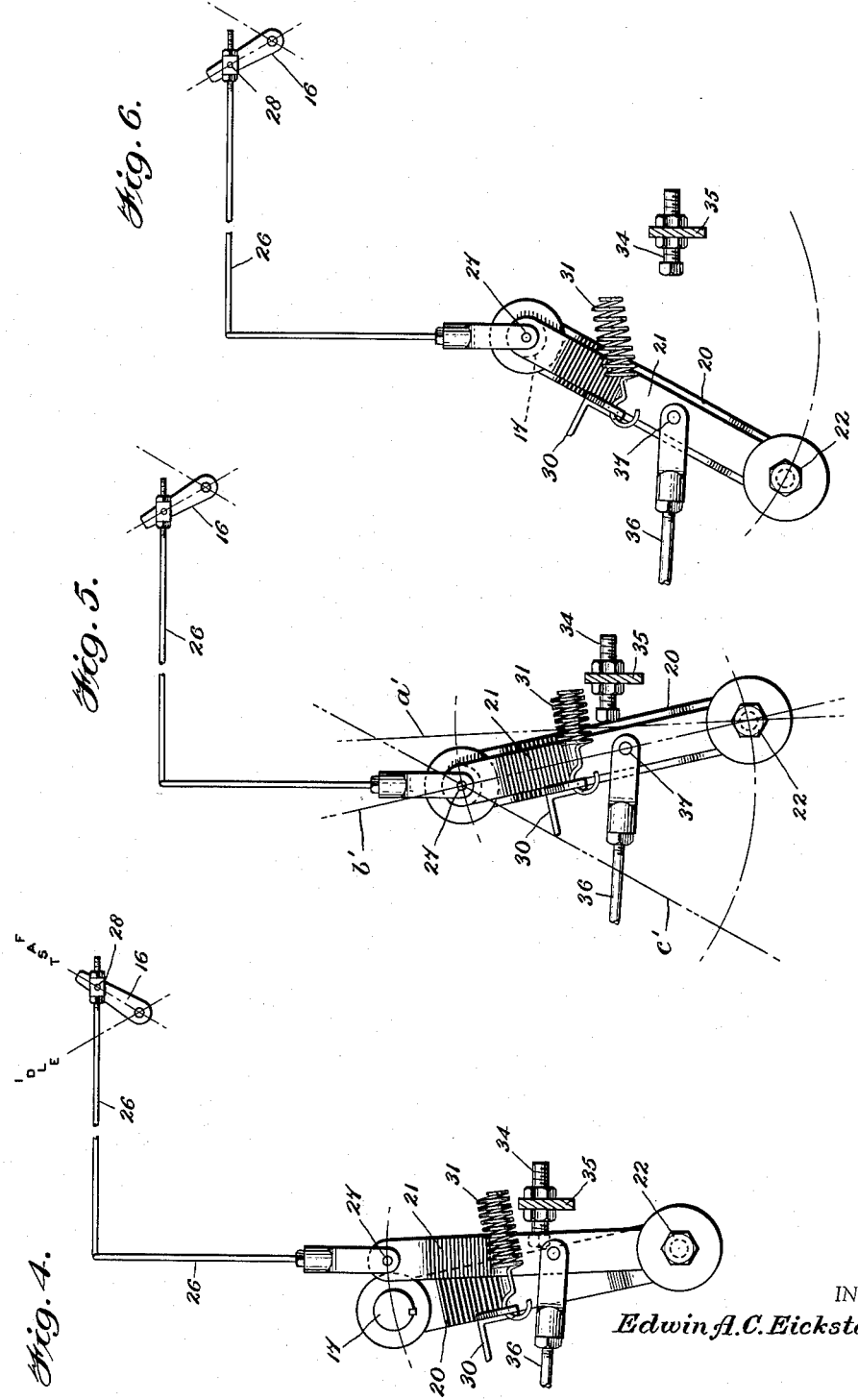
INVENTOR
Edwin A. C. Eickstaedt,
BY
ATTORNEY

United States Patent Office 2,727,600
Patented Dec. 20, 1955

2,727,600

INTERRELATED SPEED AND CLUTCH CONTROLS FOR POWER PLANTS

Edwin A. C. Eickstaedt, Milwaukee, Wis., assignor to Chain Belt Company, Milwaukee, Wis., a corporation of Wisconsin Application November 23, 1954, Serial No. 470,767

8 Claims. (Cl. 192—.096)

This invention relates to interrelated motor speed and clutch control mechanism for power plants, and has for its principal object the provision of a simple but highly effective and relatively inexpensive apparatus of this character which while primarily evolved for use in connection with the power plants of truck-mounted concrete mixers, is not necessarily limited to such field.

In truck mixer practice the mixing drums are sometimes driven by power take-offs from the truck motor but it is far more common for a separate power plant to be provided on the mixer unit for this purpose. Such plants usually comprise an internal combustion engine arranged to drive a speed-reducing gear mechanism through a friction clutch or a fluid coupling, with the final drive from the output shaft of such mechanism to the drum being effected by a chain and sprockets, or by spur gearing, providing a further speed reduction. Since it is substantially the universal practice to effect the mixing of the concrete materials through rotation of the mixing drum in one direction, and to effect discharge of the completed mixture from the drum by its rotation in the opposite direction, the speed-reducing gear mechanism commonly includes means whereby the direction of rotation of its said output shaft may be readily reversed while the engine continues to operate unidirectionally.

At least the major portion of the mixing operation is ordinarily carried on at substantially the maximum speed of the motor but when the batch is completely mixed, pending its discharge from the drum the motor is cut back to idling speed whereby drum rotation is continued at about 4-6 R. P. M. to prevent segregation of the batch constituents. The discharge of the batch may be continuous or intermittent, and at varying speeds, depending upon the need for and/or the facilities available for handling the discharged mixture. Thus, in the mixing and discharge of each batch of concrete numerous stoppages and/or reversals of the drum usually are necessary and since the weight of a full batch may range up to 15 tons or more, considerable care must be exercised in these maneuvers if undue and possibly damaging strains are not to be placed upon the power transmitting gearing, clutch and/or motor.

The present invention provides a simple and efficient mechanism whereby, by means of a single manual control lever, the speed of the engine may be varied at will between idling and maximum, and if necessary maintained at any desired speed within that range; and by means of the same control lever the clutch between the engine and the transmission gearing may be disengaged and re-engaged as necessary to effect stopping, starting and/or reversal of the mixing drum with the assurance that such clutch movements will be effected only when the motor has been reduced to idling speed, thereby facilitating shifting of the reversing elements of the transmission gear mechanism and insuring that the load will be picked up with a minimum of strain upon the motor, clutch and gearing.

The construction of the present apparatus whereby the foregoing is accomplished will be readily understood from the following description taken in conjunction with the accompanying drawings forming a part of this specification, in which:

Figure 1 is a side elevational view, partly broken away, of the essential elements of the power plant of a well known form of truck-mounted concrete mixer, said plant being equipped with an interrelated clutch and motor speed control mechanism constructed and arranged in accordance with the present invention;

Fig. 2 is an enlarged elevational view of the essential elements of the control mechanism, as seen from the right of Fig. 1;

Fig. 3 is an elevational view of the parts shown in Fig. 2, as seen from the right thereof;

Fig. 4 is an elevational view as seen from the left of Fig. 2, the parts being illustrated in the positions they occupy when the clutch is engaged and the engine throttle is in the "fast" or high speed position;

Fig. 5 is a view similar to Fig. 4 but showing an intermediate position of the parts, in which the engine throttle has been moved to "idle" or low speed position but the clutch is still engaged; and Fig. 6 is a view similar to Figs. 4 and 5, but showing the positions of the parts when the clutch is fully disengaged.

In Fig. 1 there is illustrated a power plant for a truck-mounted concrete mixer, comprising an internal combustion engine 10 the crankshaft of which is connected to the input shaft of a reversible speed-reducing gear mechanism 11 by a conventional disk or other friction clutch contained within a housing 12. The output shaft 13 of the transmission gearing 11 is connected to a bevel gear mechanism enclosed by a housing 14 and the output shaft 15 of such mechanism is connected by a spur gear or a chain and sprocket drive (not shown) to the mixing drum. The motor 10 is equipped with the usual throttle valve operable by an arm 16 to control the motor speed; and the clutch is provided with the usual oscillatory shaft 17 extending outwardly through the housing 12 whereby the clutch may be engaged and disengaged. The clutch may be provided with the usual clutch springs which normally maintain its elements in driving engagement.

The principal elements of the present device are mounted on the clutch shifting shaft 17 and comprise a depending arm 20 the upper end of which is rigidly secured to the projecting end of such shaft while the lower or free end of said arm has the lower end of an upright lever 21 pivotally secured thereto by a bolt 22. As best shown in Fig. 2, a friction washer 23 is interposed between the adjacent faces of the arm and lever, while the bolt 22 extends beyond the opposite face of said arm and carries a coiled compression spring 24, the force of which against the arm is variable by means of lock nuts 25 threaded on the bolt. This frictional connection between the lever and arm imposes restraint upon pivotal movement of the one relative to the other sufficient to normally hold them in fixed angular relationship to one another, but upon the application of force to the lever sufficient to overcome the frictional resistance of the washer as determined by the adjustment of the spring 24, the angular relationship of the lever to the arm may be readily changed, as will appear more fully below.

One end of a bent rod or link 26 is pivotally connected at 27 to the upper or free end of the lever 21 and the other end of said link is pivotally connected at 28 to the throttle valve actuating arm 16.

The clutch shifting arm 20 has a bar or bracket 30 rigidly secured to it, which bracket extends across the path of the lever 21 and when engaged thereby serves as a means for temporarily interconnecting the lever and arm for unitary movements, as will appear more fully below. Said bracket also has one end of a tension spring 31 secured to it, the other end of which spring is anchored at 32 to one of a pair of frame members 33 upon which the power plant is mounted. This spring tends to draw the arm 20 toward the right (as viewed in Fig. 1), which movement is limited however, by an adjustable stop screw 34 mounted in a plate or bracket 35 carried by said frame member 33.

One end of a rod 36 is pivotally connected to the lever 21 as at 37, while the other end of such rod is pivotally connected at 38 to an arm 39 journaled on a rock shaft 40 mounted in bearings 41 carried by the frame members 33. The said arm 39 is rigidly connected with a hand lever 42, movement of which through a determinate range, the extremes of which are indicated by the lines $a$ and $c$ in Fig. 1, effects sequential actuation of the motor-speed and clutch controls.

In the particular apparatus shown in Fig. 1 the rock shaft 40 terminates in a second hand lever 43 and rigidly carries an arm 44 which is connected by a rod or link 45 with the transmission gear mechanism 11, whereby the elements of such mechanism may be appropriately shifted to effect forward and reverse drive of the mixing drum. The said mechanism 11 also has a neutral position in which the drive to the drum is broken even though the clutch in the housing 12 is engaged.

The operation of the device above described is as follows:

In Figs. 1–4 the several parts are shown in the positions they occupy during say a mixing operation, i. e., the transmission 11 is in forward drive, the clutch in the housing 12 is engaged, and the engine throttle valve arm 16 is advanced to its high speed position. When the mixing is completed the hand lever 42 is manually moved in a counterclockwise direction from the position shown in Fig. 1 and designated by the centerline $a$, to that indicated by the center-line $b$, which lever movement is transmitted by the arm 39 and rod 36 to the lever 21. At this time the spring 31 is holding the clutch shifting arm 20 against the head of the stop screw 34, and the force exerted by the spring 24 having been so adjusted by the nuts 25 that the frictional resistance provided by the washer 23 in the pivotal joint between the lever 21 and arm 20 is not sufficient to overcome the force of spring 31, the latter restrains and holds the said arm stationary while the pull of rod 36 on lever 21 swings such lever about the bolt 22, from the position shown in Fig. 4 to that shown in Fig. 5. This movement of the lever 21 is transmitted by the link 26 to the throttle valve arm 16, thereby moving the valve to the "idle" position and reducing the speed of the engine correspondingly at which speed the drum will be rotating at say 4–5 R. P. M. to maintain the concrete in properly mixed condition.

When it is desired to stop drum rotation in order to effect reversal thereof and discharge of the concrete, the hand lever 42 is moved from its $b$ position to that indicated by the center-line $c$ in Fig. 1. The initial movement of the lever 21 to its Fig. 5 position as above described has brought such lever into contact with the bracket 30 of the clutch shifting arm 20, thereby coupling the arm and lever together insofar as further leftward movement of the lever is concerned, and thus the movement of the hand lever 42 to its $c$ position causes the lever 21 to swing the arm 20 in a clockwise direction about the axis of shaft 17 and bring the parts to the positions shown in Fig. 6. Since the arm 20 is rigidly mounted on the clutch shifting shaft 17 it moves the latter to effect disengagement of the clutch against the action of the engagement springs thereof and/or the spring 31.

With the hand lever 42 held in its $c$ position, the transmission control lever 43 may be manipulated to shift the transmission mechanism 11 into reverse, whereupon return of the hand lever 42 to its $b$ position and the other parts to their Fig. 5 positions under the action of the spring 31 will effect re-engagement of the clutch and pick-up of the load to idling speed. If a speed higher than this be desired for discharge of all or any part of the batch, such speed may be readily attained by further movement of the hand lever 42 toward or to its $a$ position. During movement of such lever in the $a$—$b$ portion of its range it is not being acted upon by the spring 31 because at the $b$ position the clutch shifting arm 20 has contacted the head of the stop screw 34, after which clockwise movement of lever 42 merely swings the lever 21 about the pivot bolt 22 free from the influence of said spring. Throughout this portion of the travel of the lever 42 therefore, the frictional resistance imposed by the washer 23 and spring 24 to relative movement between the lever 21 and arm 20 will restrain the parts sufficiently to hold the lever 42 and the throttle valve arm 16 in any position to which they may be manually adjusted, and manual control of the lever 42 may be relinquished when the desired setting is reached. The above of course is also true when the transmission 11 is in forward drive.

As will be noted from Figs. 4–6, the distance between the axis of the lever pivot bolt 22 and the axis of the pivots 27 which connect the link 26 to lever 21 is equal to the distance from the said bolt axis to that of the clutch shifting shaft 17, whereby when the said lever 21 is moved from its Fig. 4 position to its Fig. 5 position the axis of pivots 27 is brought into coincidence with the said shaft axis. It results therefrom that during movements of the lever 21 and arm 20 between the Fig. 5 and Fig. 6 positions there is pivotal movement between the upper end of the lever 21 and the complementary end of the link 26, without any translational movement of the latter, whereby during the clutch disengaging and re-engaging actions there is no movement of the throttle valve arm 16, it remaining in its "idle" position.

The procedure above described will be followed in restoring the transmission 11 to its forward drive condition. If it be desired to stop drum rotation for an extended period of time, with the hand lever 42 moved to its $c$ position the transmission control lever 43 may be manipulated to place the transmission gearing in neutral and thus upon return of the lever 42 to its $b$ position the drive will be broken in the transmission even though the clutch be engaged.

In Fig. 5 the several positions of the lever 21 and arm 20 which correspond to the $a$, $b$ and $c$ positions of the hand lever 42 have been indicated by the lines $a'$, $b'$ and $c'$, respectively.

From the foregoing it will be readily understood that although effected by a single actuating means, the clutch disengagement and re-engagement operation and the motor speed control operation are separate and sequential with respect to one another, with the clutch control operations being possible only when the motor has been reduced to idling speed.

What is claimed is:

1. Interrelated control mechanism for a power plant which plant includes a motor provided with a speed control element, and a clutch having a shifting shaft, said mechanism comprising an arm rigidly mounted on said clutch shifting shaft; a lever pivotally carried by said arm for movements relative thereto; a link connecting said lever with said motor speed control element; actuating means connected to the lever and movable through a determinate range during one portion of which said means swing the lever relative to the arm whereby to shift the speed control element; means acting on said arm to restrain movement thereof during such swinging movements of the lever; and means for temporarily interconnecting the lever and arm for unitary movement thereof whereby movement of said actuating means through another portion of its range produces movement of the clutch shifting shaft sequentially with respect to actuation of the speed control element.

2. Interrelated control mechanism for a power plant which plant includes a motor provided with a speed control element, and a clutch having an oscillatable shifting shaft, said mechanism comprising an arm rigidly mounted on said clutch shifting shaft; a lever pivotally carried by said arm for movement relative thereto; a link connecting the lever with said motor speed control element; actuating means connected to the lever and movable through a determinate range during one portion of which said means swing the lever relative to the arm whereby to shift the speed control element; resilient means acting on said arm to restrain movement thereof during said swinging movements of the lever; and interengageable means on the arm and lever for coupling them together whereby movement of said actuating means through another portion of its range produces unitary movement of the lever and arm against the action of said resilient means, and movement of the clutch shifting shaft sequentially with respect to actuation of the speed control element.

3. Interrelated control mechanism for a power plant which plant includes a motor provided with a speed control element, and a clutch having a shifting shaft, said mechanism comprising an arm rigidly mounted on said clutch shifting shaft; a lever pivotally carried by said arm for movements relative thereto; a link connecting said lever with the motor speed control element; actuating means connected to the lever and movable through a determinate range during one portion of which said means swing the lever relative to the arm whereby to shift the speed control element between high speed and low speed positions; means acting on said arm to restrain movement thereof during such swinging movements of the lever; and interengageable means on the arm and lever arranged to couple them together only when the speed control element is in its said low speed position, whereby movement of said actuating means through another portion of its range may produce unitary movements of the lever, arm and clutch shifting shaft to effect engagement and disengagement of the clutch only when the motor is operating at low speed.

4. Interrelated control mechanism for a power plant which plant includes a motor provided with a speed control element, and a clutch having an oscillatable shifting shaft, said mechanism comprising an arm rigidly mounted on said clutch shifting shaft; a lever pivotally carried by said arm for movements relative thereto; a link extending from the motor speed control element to said lever and having a pivotal connection therewith which is movable by the lever to and from a co-axial relationship with the clutch shifting shaft; actuating means connected to the lever and movable through a determinate range during one portion of which said means swing the lever relative to the arm to move said link connection to and from its co-axial relationship with the clutch shifting shaft, with consequent shifting of the motor speed control element; means acting on the arm to prevent movement thereof during such swinging movements of the lever; and means for interconnecting the arm and lever when said link connection reaches its said co-axial relationship with the clutch shifting shaft, whereby movements of said actuating means through another portion of its range produce unitary movements of the lever, arm and shaft to engage and disengage the clutch while said co-axial relationship of the link connection prevents movements of the link and speed control element.

5. Interrelated control mechanism for a power plant which plant includes a motor provided with a speed control element, and a clutch having an oscillatable shifting shaft, said mechanism comprising an arm rigidly mounted on said clutch shifting shaft; a lever pivotally carried by said arm for movements relative thereto; a link extending from the motor speed control element to said lever and having a pivotal connection therewith, the pivotal connection between the arm and lever being equidistant from said link connection and the axis of the clutch shifting shaft whereby in one position of the lever relative to the arm said link connection will be disposed co-axially with the clutch shifting shaft; actuating means connected to the lever and movable through a determinate range during one portion of which said means swing the lever relative to the arm and thereby move said link connection to and from its said co-axial relation with the clutch shifting shaft with consequent movement of the speed control element; resilient means acting on the arm to restrain movement thereof during such swinging movements of the lever; and interengageable means on the arm and lever arranged to couple them together when said link connection reaches its co-axial relation with the clutch shifting shaft, whereby movements of said actuating means through another portion of its range produce unitary movements of the lever, arm and shaft against the action of said resilient means, during which time said co-axial relationship of the link connection prevents movements of the link and speed control element.

6. Interrelated control mechanism for a power plant which plant includes a motor provided with a speed control element, and a clutch having a shifting shaft, said mechanism comprising an arm rigidly mounted on said clutch shifting shaft; a lever pivotally connected to said arm for movements relative thereto; a link connecting said lever with the motor speed control element; actuating means connected to the lever and movable through a determinate range during one portion of which said means swing the lever relative to the arm whereby to shift the speed control element between a high speed and a low speed position thereof; means acting on said arm to restrain movements thereof during such swinging movements of the lever; interengageable means on the arm and lever arranged to couple them together only when the speed control element is in its said low speed position, whereby movements of said actuating means through another portion of its range may produce unitary movements of the lever, arm and clutch shifting shaft to effect engagement and disengagement of the clutch only when the motor is operating at low speed; and means acting on the pivotal connections between the arm and lever to restrain movements of the latter relative to the arm, whereby the motor speed control element may be maintained in any desired position between its said high speed and low speed positions when the clutch is engaged.

7. Interrelated control mechanism for a power plant which plant includes a motor provided with a speed control element, and a clutch having a shifting shaft, said mechanism comprising an arm rigidly mounted on said clutch shifting shaft; a lever pivotally connected to said arm for movements relative thereto; a link connecting said lever with the motor speed control element; actuating means connected to the lever and movable through a determinate range during one portion of which said means swing the lever relative to the arm whereby to shift the speed control element between a high speed and a low speed position thereof; means acting on said arm to restrain movements thereof during such swinging movements of the lever; interengageable means on the arm and lever arranged to couple them together only when the speed control element is in its said low speed position, whereby movements of said actuating means through another portion of its range may produce unitary movements of the lever, arm and clutch shifting shaft to effect engagement and disengagement of the clutch only when the motor is operating at low speed; and friction means included in the pivotal connections between the arm and lever and acting to restrain movements of the latter relative to the arm, whereby the motor speed control element may be maintained in any desired position between its said high speed and low speed positions when the clutch is engaged.

8. Interrelated control mechanism for a power plant which plant includes a motor provided with a speed control element, and a clutch having a shifting shaft, said mechanism comprising an arm rigidly mounted on said clutch shifting shaft; a lever pivotally connected to said arm for movements relative thereto; a link connecting said lever with the motor speed control element; actuating means connected to the lever and movable through a determinate range during one portion of which said means swing the lever relative to the arm whereby to shift the speed control element between a high speed and a low speed position thereof; resilient means acting on said arm to restrain movements thereof during such swinging movements of the lever; interengageable means on the arm and lever arranged to couple them together only when the speed control element is in its said low speed position, whereby movements of said actuating means through another portion of its range may produce unitary movements of the lever, arm and clutch shifting shaft to effect engagement and disengagement of the clutch only when the motor is operating at low speed; a friction washer included in the pivotal connections between the arm and lever and acting to restrain movements of the latter relative to the arm, whereby the motor speed control element may be maintained in any desired position between its said high speed and low speed positions when the clutch is engaged; and means for adjusting the frictional restraint of said washer on the arm and lever in relation to the force exerted by said resilient arm restraining means.

References Cited in the file of this patent
UNITED STATES PATENTS

| | | |
|---|---|---|
| 1,620,763 | Hull | Mar. 15, 1927 |
| 1,663,413 | Millington | Mar. 20, 1928 |
| 2,086,501 | Hill et al. | July 6, 1937 |
| 2,117,016 | Brumbaugh | May 10, 1938 |
| 2,219,601 | Quartullo | Oct. 29, 1940 |
| 2,589,649 | Wheeler | Mar. 18, 1952 |